United States Patent
Huang et al.

(10) Patent No.: US 10,349,409 B2
(45) Date of Patent: Jul. 9, 2019

(54) METHOD AND SYSTEM FOR TRANSMISSION SCHEDULE INSTRUCTION FOR ALLOCATING RESOURCES IN AN UNLICENSED SPECTRUM

(71) Applicant: Beijing Zhigu Rui Tuo Tech Co., Ltd., Beijing (CN)

(72) Inventors: Weicai Huang, Beijing (CN); Na Wei, Beijing (CN)

(73) Assignee: BEIJING RUI TUO TECH CO., LTD., Beijing (CN)

( * ) Notice: Subject to any disclaimer, the term of this patent is extended or adjusted under 35 U.S.C. 154(b) by 22 days.

(21) Appl. No.: 15/241,481

(22) Filed: Aug. 19, 2016

(65) Prior Publication Data
US 2017/0064712 A1   Mar. 2, 2017

(30) Foreign Application Priority Data
Sep. 1, 2015 (CN) .......................... 2015 1 0552510

(51) Int. Cl.
*H04W 72/04* (2009.01)
*H04W 28/26* (2009.01)
(Continued)

(52) U.S. Cl.
CPC ....... *H04W 72/0453* (2013.01); *H04W 16/14* (2013.01); *H04W 72/02* (2013.01);
(Continued)

(58) Field of Classification Search
CPC ........... H04W 72/0453; H04W 72/042; H04W 74/0808; H04W 72/04; H04W 72/12;
(Continued)

(56) References Cited

U.S. PATENT DOCUMENTS

2009/0016243 A1* 1/2009 Kimura ............. H04W 72/1263
370/280
2010/0085975 A1* 4/2010 Wang et al. ............. 370/395.53
(Continued)

FOREIGN PATENT DOCUMENTS

| CN | 101754242 A | 6/2010 |
| CN | 102202028 A | 9/2011 |
| WO | 2015081838 A | 6/2015 |

OTHER PUBLICATIONS

"3GPP TSG RAN WG2#89bis R2-151292", ETRI, 2 Discussion, Apr. 24, 2015.
(Continued)

*Primary Examiner* — Meless N Zewdu
(74) *Attorney, Agent, or Firm* — Sheppard Mullin Richter & Hampton LLP

(57) ABSTRACT

Embodiments of the present invention disclose a resource allocation method, a transmission method, and apparatuses. The resource allocation method comprises: sending a scheduling instruction, wherein the scheduling instruction comprises: information that is associated with at least two carriers in an unlicensed spectrum allocated to transmission of a user equipment; determining at least one available carrier in the at least two carriers; and sending a physical indication signal on the at least one available carrier, wherein the physical indication signal is used to occupy the at least one available carrier. According to the method and apparatus of the embodiments of the present invention, at least two carriers is allocated to transmission of a user equipment at a scheduling moment, at least one available carrier in the at least two carriers is determined, and a physical indication signal is used to occupy the at least one available carrier, thereby reducing the possibility of occurrence of the problem of resource unavailability and/or (Continued)

resource waste caused by the unpredictability of whether an unlicensed spectrum is available.

14 Claims, 6 Drawing Sheets

(51) Int. Cl.
| | |
|---|---|
| *H04W 72/12* | (2009.01) |
| *H04W 72/14* | (2009.01) |
| *H04W 16/14* | (2009.01) |
| *H04W 72/02* | (2009.01) |
| *H04W 74/08* | (2009.01) |

(52) U.S. Cl.
CPC ............ *H04W 72/04* (2013.01); *H04W 28/26* (2013.01); *H04W 72/042* (2013.01); *H04W 72/12* (2013.01); *H04W 72/14* (2013.01); *H04W 74/0808* (2013.01)

(58) Field of Classification Search
CPC ..... H04W 72/14; H04W 28/26; H04W 28/16; H04W 28/18; H04W 72/00; H04W 72/1278; H04W 72/1284; H04W 72/1289; H04W 72/1294; H04W 72/0486; H04W 72/1263; H04W 74/00; H04W 74/002; H04W 74/08; H04W 74/0816; H04W 72/06; H04W 80/00; H04W 80/02; H04W 28/20; H04W 72/0413
See application file for complete search history.

(56) References Cited

U.S. PATENT DOCUMENTS

| | | | | |
|---|---|---|---|---|
| 2010/0145862 | A1* | 6/2010 | Chang | ............................ 705/80 |
| 2012/0327877 | A1* | 12/2012 | Zhao | ................. H04W 72/1252 370/329 |
| 2013/0028134 | A1* | 1/2013 | Wang | ..................... H04L 5/0048 370/254 |
| 2014/0362789 | A1* | 12/2014 | Makh | .................... H04W 48/12 370/329 |
| 2015/0373741 | A1* | 12/2015 | Yerramalli | ............ H04W 24/08 370/336 |
| 2016/0043842 | A1* | 2/2016 | Gong | ..................... H04L 5/0048 370/329 |
| 2016/0095134 | A1* | 3/2016 | Chen | ................. H04W 72/1268 370/336 |
| 2016/0242039 | A1* | 8/2016 | Drugge | ................. H04W 16/14 |
| 2016/0278050 | A1* | 9/2016 | Nory | ..................... H04W 16/14 |
| 2016/0278118 | A1* | 9/2016 | Yerramalli | .............. H04L 5/001 |
| 2016/0338107 | A1* | 11/2016 | Zeng | ..................... H04W 16/14 |
| 2017/0064558 | A1* | 3/2017 | Li | .......................... H04W 16/14 |
| 2017/0064559 | A1* | 3/2017 | Li | .......................... H04W 16/14 |
| 2017/0273110 | A1* | 9/2017 | Chen | ................. H04W 74/0808 |
| 2018/0176956 | A1* | 6/2018 | Koutsimani et al. | ........................ H04W 74/0816 |

OTHER PUBLICATIONS

"3GPP TSG RAN WG1 Meeting #81 R1-153001", ETRI, 2.3 UL self-scheduling with LBT by eNB, May 29, 2015.

* cited by examiner

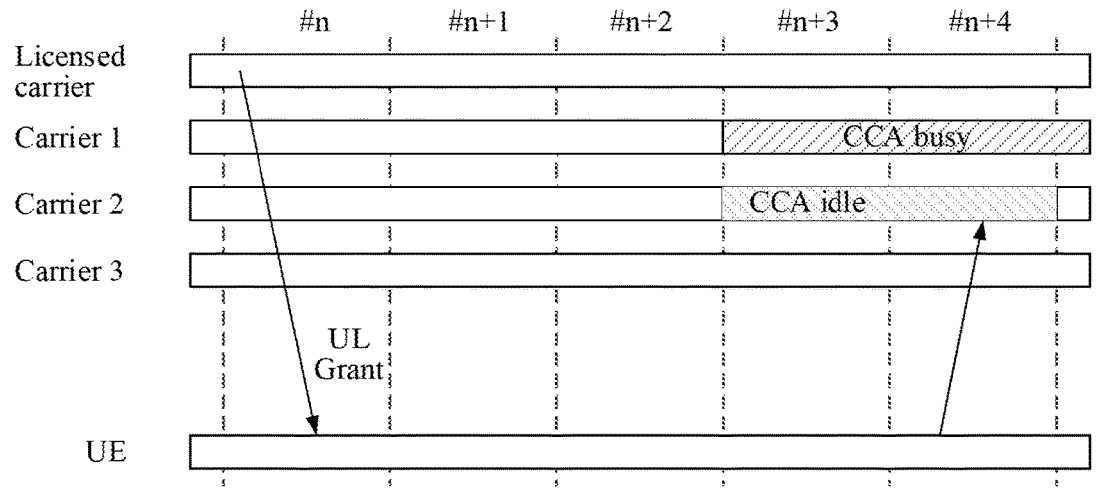
FIG. 1 -- Prior Art --
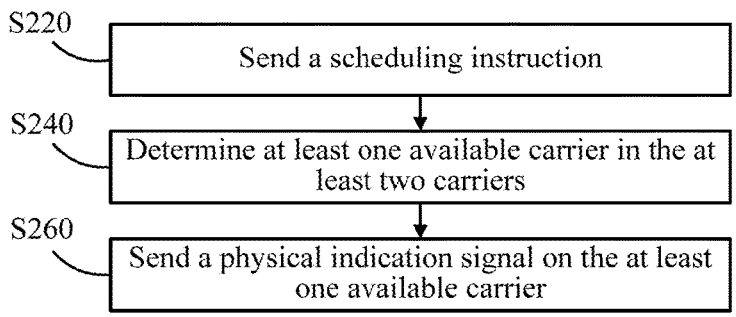
FIG. 2(a)
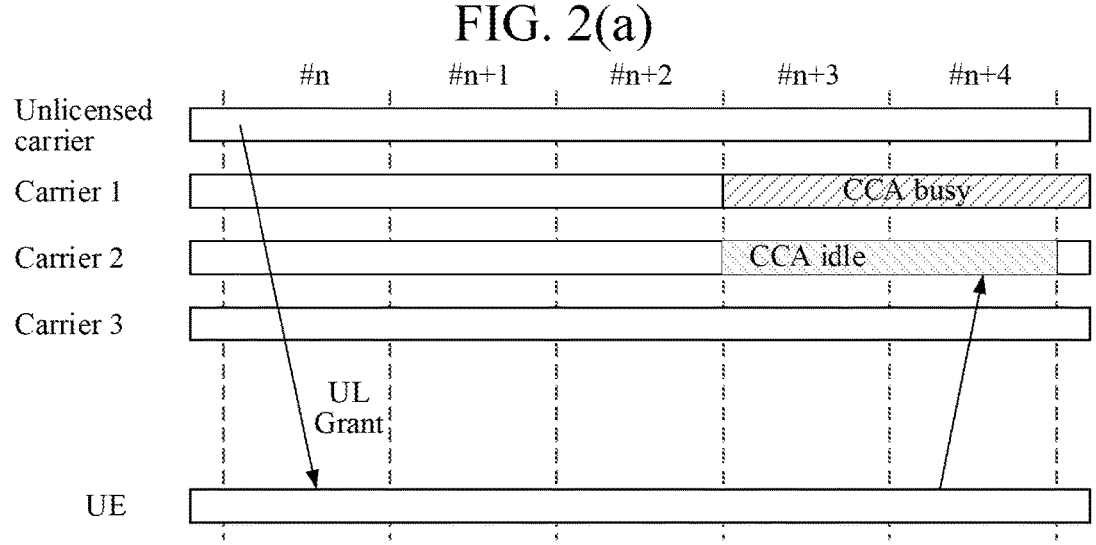
FIG. 2(b)

METHOD AND SYSTEM FOR TRANSMISSION SCHEDULE INSTRUCTION FOR ALLOCATING RESOURCES IN AN UNLICENSED SPECTRUM

TECHNICAL FIELD

This application relates to the field of communications technologies, and in particular, to a resource allocation method, a transmission method, and apparatuses.

BACKGROUND

Licensed spectra, that is, wireless spectra that operators are authorized to use as regulated by the laws of various countries, can be used only by those having a license and authorization and having passed the network entry test. Unlicensed spectra, for example, working frequency bands of WiFi and Bluetooth devices, can be used without authorization from the government. Because the shortage of licensed spectrum resources allocated to mobile communication restricts the development scale of mobile communications networks in the future, combining licensed spectra with the large number of unlicensed spectra to improve the transmission capacity of mobile networks is currently being considered. Statistics indicate that currently in the 5 GHz frequency band, unlicensed spectrum resources that have been allocated in various countries may exceed 500 MHz in total. These unlicensed WiFi spectra have attracted attention from mobile communications equipment vendors, mobile network operators and so on. Accordingly, solutions such as LTE-U (Unlicensed LTE, Unlicensed LTE) emerge, and the launch of projects for testing the Unlicensed LTE technology was recently announced. The license assisted access (License Assisted Access, LAA) technology that the international standardization organization 3GPP is currently studying is a typical solution of expanding the capacity of mobile communications systems by using unlicensed spectra, which allows an LTE system to use unlicensed spectra to further improve the transmission capacity of the LTE system.

In an LAA system, a base station may use an unlicensed spectrum to increase the user throughput and the system capacity. However, because multiple systems share a same unlicensed spectrum, a conventional contention mechanism is generally adopted to determine how to use the unlicensed spectrum, in order to enable the systems to have the same opportunity to access the unlicensed spectrum. Using uplink scheduling of the LAA system as an example, for example, a mainstream implementation method that is proposed at present is as follows: A base station first schedules some user equipments (User Equipment, UE) at a scheduling moment, and determines, in a scheduling instruction (UL Grant), information such as a time-frequency resource occupied by a user and a transmission format, to instruct the user equipments to prepare for uplink transmission. After several frames, the base station performs clear channel assessment (Clear Channel Assessment, CCA) to determine whether a current channel is in a busy or idle state, and when the channel is idle, sends a physical layer signal (for example, a reservation signal (Reservation Signal)) to occupy the channel. At a next transmission moment, the user equipment sends uplink data according to the time-frequency resource and the transmission format that are indicated by the base station. It can be seen that different from a conventional mobile communications system using a licensed spectrum, the LAA base station cannot determine, at the scheduling moment, whether an unlicensed carrier is available at the transmission moment after several frames that is indicated by the scheduling instruction, that is, whether the unlicensed spectrum is available is unpredictable.

As shown in FIG. 1, the base station schedules a user equipment (User Equipment, UE) by using a scheduling instruction (UL Grant) in the $n^{th}$ subframe, wherein it is indicated in the UL Grant that a carrier resource allocated to the user equipment is a carrier 2, and it is also determined in the UL Grant that information such as a format used for transmission, to instruct the user equipment to prepare for uplink transmission. In the $(n+3)^{th}$ subframe, the base station performs clear channel assessment to determine whether a current channel is in a busy or idle state, preempts the idle carrier 2, and sends a Reservation Signal on the carrier 2 to occupy the channel. Then, in the $(n+4)^{th}$ subframe, the user equipment sends uplink data on the carrier 2 according to the transmission format indicated by the base station. However, if the base station fails to preempt the carrier 2, there will be no available transmission resource for the user equipment at the transmission moment; or if the base station has preempted a carrier 3 but does not allocate the carrier 3 to the user equipment at the scheduling moment, the resource is wasted.

SUMMARY

In view of this, an objective of embodiments of the present invention is to provide a resource allocation solution that can avoid the problem of resource shortage and/or resource waste caused by the unpredictability of whether an unlicensed spectrum is available.

To achieve the above objective, according to a first aspect of the embodiments of the present invention, a resource allocation method is provided, the method comprising:

sending a scheduling instruction, wherein the scheduling instruction comprises: information that is associated with at least two carriers in an unlicensed spectrum allocated to transmission of a user equipment;

determining at least one available carrier in the at least two carriers; and sending a physical indication signal on the at least one available carrier, wherein the physical indication signal is used to occupy the at least one available carrier.

According to a second aspect of the embodiments of the present invention, a transmission method is provided, the method comprising:

acquiring a scheduling instruction, wherein the scheduling instruction comprises information that is associated with at least two carriers in an unlicensed spectrum allocated to transmission of a user equipment; and determining to perform the transmission on at least one available carrier in the at least two carriers.

According to a third aspect of the present invention, a resource allocation apparatus is provided, the apparatus comprising:

a scheduling module, configured to send a scheduling instruction, wherein the scheduling instruction comprises: information that is associated with at least two carriers in an unlicensed spectrum allocated to transmission of a user equipment;

a first determining module, configured to determine at least one available carrier in the at least two carriers; and a first sending module, configured to send a physical indication signal on the at least one available carrier, wherein the physical indication signal is used to occupy the at least one available carrier.

According to a fourth aspect of the present invention, a transmission apparatus is provided, the apparatus comprising:

an acquiring module, configured to acquire a scheduling instruction, wherein the scheduling instruction comprises information that is associated with at least two carriers in an unlicensed spectrum allocated to transmission of a user equipment; and a second determining module, configured to determine to perform the transmission on at least one available carrier in the at least two carriers.

According to a fifth aspect of the present invention, a resource allocation apparatus is provided, the apparatus comprising:

a transceiver;

a memory, configured to store an instruction; and a processor, configured to execute the instruction stored in the memory, wherein the instruction causes the processor to execute the following steps:

sending a scheduling instruction by using the transceiver, wherein the scheduling instruction comprises: information that is associated with at least two carriers in an unlicensed spectrum allocated to transmission of a user equipment;

determining at least one available carrier in the at least two carriers; and sending a physical indication signal on the at least one available carrier by using the transceiver, wherein the physical indication signal is used to occupy the at least one available carrier.

According to a sixth aspect of the present invention, a transmission apparatus is provided, the apparatus comprising:

a transceiver;

a memory, configured to store an instruction; and a processor, configured to execute the instruction stored in the memory, wherein the instruction causes the processor to execute the following steps:

acquiring a scheduling instruction by using the transceiver, wherein the scheduling instruction comprises information that is associated with at least two carriers in an unlicensed spectrum allocated to transmission of a user equipment; and determining to perform the transmission on at least one available carrier in the at least two carriers.

According to the method and apparatus of the embodiments of the present invention, at least two carriers is allocated to transmission of a user equipment at a scheduling moment, at least one available carrier in the at least two carriers is determined, and a physical indication signal is used to occupy the at least one available carrier, thereby reducing the possibility of occurrence of the problem of resource unavailability and/or resource waste caused by the unpredictability of whether an unlicensed spectrum is available.

BRIEF DESCRIPTION OF THE DRAWINGS

FIG. 1 is a schematic diagram of an uplink scheduling process of a conventional LAA system;

FIG. 2(a) is a flowchart of an example of a resource allocation method according to an embodiment of the present invention;

FIG. 2(b) and FIG. 2(c) are schematic diagrams of a process of performing uplink scheduling in a resource allocation method according to an embodiment of the present invention;

DETAILED DESCRIPTION

Figure 2C:
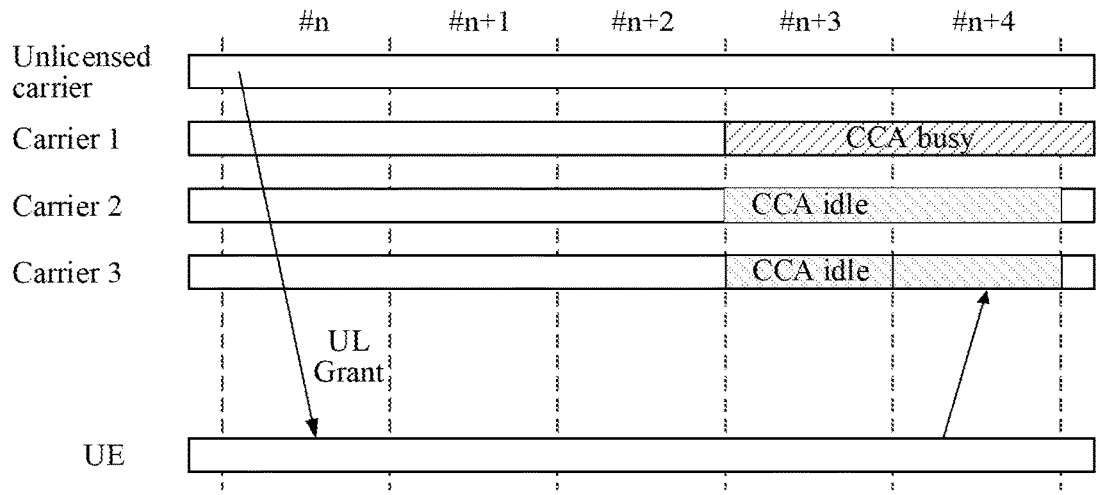

The following further describes specific implementation manners of the present invention in detail with reference to the accompanying drawings and embodiments. The following embodiments are used for describing the present invention, rather than limiting the scope of the present invention.

A person skilled in the art may understand that, terms such as "first" and "second" in the present application are merely used to distinguish different devices, modules, parameters or the like, and neither represent any specific technical meanings, nor represent any necessary logic sequence between the steps, devices, modules, or the like.

FIG. 2(a) is a flowchart of an example of a resource allocation method provided by an embodiment of the present invention. The method may be executed by a base station. As shown in FIG. 2(a), the method comprises:

S220. Send a scheduling instruction, wherein the scheduling instruction comprises: information that is associated with at least two carriers in an unlicensed spectrum allocated to transmission of a user equipment.

S240. Determine at least one available carrier in the at least two carriers.

S260. Send a physical indication signal on the at least one available carrier, wherein the physical indication signal is used to occupy the at least one available carrier.

In the method of this embodiment, at least two carriers are allocated to transmission of a user equipment at a scheduling moment, that is, it is intended to schedule the user equipment on at least one of the at least two carriers. At least one available carrier in the at least two carriers is determined, and a physical indication signal is used to occupy the at least one available carrier. In this way, the probability that the carrier resource is available to the user equipment is increased, thereby reducing the possibility of occurrence of the problem of resource unavailability and/or resource waste caused by the unpredictability of whether an unlicensed spectrum is available.

In a possible implementation manner, one available carrier may be determined by means of, for example, clear channel assessment in the step S240, and a physical indication signal is used to occupy the available carrier in the step S260, so that for the user equipment, there is one available carrier in the at least two carriers allocated thereto. Specifically, the step S240 may further comprise:

S242. Perform clear channel assessment for the at least two carriers in sequence, and determining, in response to that a result of the assessment is idle, that the corresponding carrier is the one available carrier. That is, as long as a carrier of which the result of the assessment is idle is determined, clear channel assessment will not be performed for other carriers, thereby reducing power consumption of the base station.

For example, as shown in FIG. 2(b), the base station sends a UL Grant to the user equipment in the $n^{th}$ subframe, wherein the UL Grant schedules the user equipment to perform transmission on carriers 1, 2, and 3. In the $(n+3)^{th}$ subframe, the base station performs CCA for the carriers 1, 2, and 3 in sequence, determines that the carrier 1 is busy and the carrier 2 idle, and then sends a reservation signal on the carrier 2. In this case, the base station does not need to perform CCA for the carrier 3.

In another possible implementation manner, to further increase the probability that the user equipment can use an unlicensed carrier, multiple available carriers may be determined by means of, for example, clear channel assessment in the step S240, and a physical indication signal is used to occupy the available carriers in the step S260, so that for the user equipment, there are multiple available carriers that have been actually occupied in the at least two carriers allocated thereto. In addition, in this implementation manner, the user equipment may determine one or more of the multiple available carriers for transmission.

For example, as shown in FIG. 2(c), the base station sends a UL Grant to the user equipment in the $n^{th}$ subframe, wherein the UL Grant schedules the user equipment to perform transmission on carriers 1, 2, and 3. In the $(n+3)^{th}$ subframe, the base station performs CCA for the carriers 1, 2, and 3, determines that the carrier 1 is busy and the carriers 2 and 3 are idle, and then sends a reservation signal on the carriers 2 and 3 to occupy the carriers 2 and 3.

It should be noted that in the step S220, it may be determined according to a transmission requirement of the user equipment to allocate at least two carriers to the user equipment. For example, the user equipment needs data of a higher transmission priority, and because such data is urgent, a relatively high probability of carrier availability is needed. In this case, at least two carriers may be allocated to the user equipment. In addition, it should also be noted that the at least two carriers allocated to the user equipment may be determined according to at least a historical usage status of the unlicensed spectrum, wherein the historical usage status may comprise but not limited to: the number of times of successful occupation by the base station, the number of times of failed occupation by the base station, the number of times of transmission performed for a same type of service, and the like. For example, the user equipment may be allocated at least two carriers corresponding to a large number of times of successful occupation by the base station, or may be allocated at least two carriers that can be determined according to the historical usage status to be suitable for use by the user equipment to perform the transmission.

Based on the above, the method of this embodiment can reduce the occurrence of the problem of resource unavailability and/or resource waste.

Figure 3:
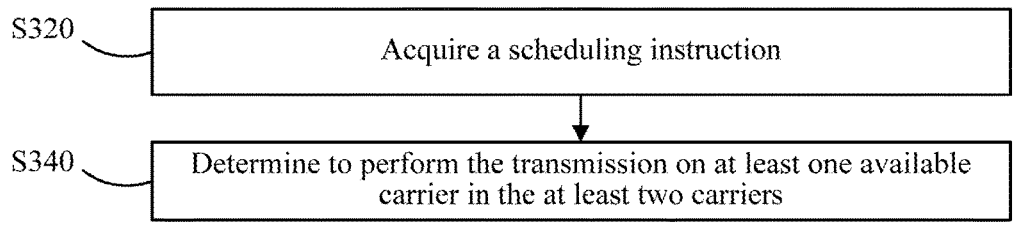
FIG. 3 is a flowchart of an example of a transmission method according to an embodiment of the present invention.

FIG. 3 is a flowchart of an example of a transmission method provided by an embodiment of the present invention. The method may be executed by any user equipment. As shown in FIG. 3, the method comprises:

S320. Acquire a scheduling instruction, wherein the scheduling instruction comprises information that is associated with at least two carriers in an unlicensed spectrum allocated to transmission of a user equipment.

S340. Determine to perform the transmission on at least one available carrier in the at least two carriers.

As described with reference to FIG. 2(a), in the method of this embodiment, at least two carriers available to the user equipment are indicated in the acquired scheduling instruction. In the step S340, it may be determined by, for example, actively performing CCA and/or listening for a physical indication signal on the at least two carriers, to perform the transmission on at least one available carrier in the at least two carriers.

Specifically, as described with reference to FIG. 2(a), the base station may send a physical indication signal on one or more available carriers. In a possible implementation manner of the method of this embodiment, the following operations may be performed: listening on carriers associated with the unlicensed spectrum, and determining, according to a result of the listening, at least one available carrier for uplink transmission. In this implementation manner, the step S340 may further comprise:

S342. Listen on at least the at least two carriers.

S344. Determine the at least one available carrier in response to that a physical indication signal is obtained on at least one carrier of the at least two carriers by listening.

It should be noted that each user equipment in an LAA system can listen for a possible physical indication signal on a particular frequency band, and according to different configurations of the LAA system, the particular frequency band may be an entire frequency band or a partial frequency band of one or more carriers in an unlicensed spectrum, which may be configured in advance for the user equipment by using higher-layer signaling (for example, RRC (Radio Resource Control, Radio Resource Control) signaling). Alternatively, the user equipment may listen on only carriers associated with its transmission. The carriers associated with its transmission comprise the at least two carriers indicated by the base station in the UL Grant. That is, in the step S342, listening may be performed on at least the at least two carriers. In the step S344, it is determined that the transmission may be performed on one or more of one or more available carriers on which a physical indication signal is obtained by listening.

In a possible implementation manner, to reduce power consumption of the user equipment, in the step S342, listening may be performed on the at least two carriers in sequence, and according to a required carrier quantity, after a physical indication signal is obtained by listening, listening will not be performed on other carriers. In S344, it is determined to perform the transmission on one or more available carriers corresponding to the physical indication signal.

Using a scenario shown in FIG. 2(b) as an example, the user equipment listens on the carriers 1, 2, and 3, obtains a physical indication signal on the carrier 2 by listening, and therefore determines to perform uplink transmission on the carrier 2 in the $(n+4)^{th}$ subframe. Using a scenario shown in FIG. 2(c) as an example, the user equipment can obtain a physical indication signal on both the carriers 2 and 3 by listening. In this case, it may be determined to perform the transmission on either one or both of the carrier 2 and/or the carrier 3. Alternatively, in the scenario shown in FIG. 2(c), the user equipment listens on the carriers 1, 2, and 3 in sequence, and after obtaining a physical indication signal on the carrier 2 by listening, stops listening, that is, does not listen on the carrier 3.

In another possible implementation manner, in the method of this embodiment, it may be determined, by actively performing CCA, to perform the transmission on the at least one available carrier. In this implementation manner, the step S340 may further comprise:

S342. Listening on at least the at least two carriers.

S346. Perform, in response to that a physical indication signal is obtained on at least one carrier of the at least two carriers by listening, clear channel assessment for the carrier corresponding to the physical indication signal, and determine the at least one available carrier according to a result of the assessment.

Using the scenario shown in FIG. 2(c) as an example, the user equipment can obtain a physical indication signal on both the carriers 2 and 3 by listening. In this case, in the step S346, it is determined, by performing CCA for the carriers 2 and 3, to perform the transmission on one or two available carriers in the carriers 2 and 3.

Alternatively, the step S340 may further comprise:

S342. Listen on at least the at least two carriers.

S345. Perform clear channel assessment for at least the at least two carriers.

S347. Determine a carrier on which a physical indication signal is obtained by listening and of which the result of the assessment is idle, as the at least one available carrier.

The step S342 and the step S345 may be performed concurrently or performed in any particular order. Still using the scenario shown in FIG. 2(c) as an example, a physical indication signal is obtained on the carriers 2 and 3 by listening, and it is determined by means of CCA that the carrier 3 is idle. In this case, it is determined to perform the transmission on the carrier 3.

In addition, the method of this embodiment further comprises:

S360. Perform the transmission by using the at least one available carrier.

S380. Send information that is associated with use of the at least one available carrier for the transmission, so as to enable the base station to learn the usage status of the available carrier. The information that is associated with the use of the at least one available carrier for the transmission may be data being transmitted. If the base station receives the data of the user equipment on an available carrier, the base station may consider that the available carrier is occupied by the user equipment. Alternatively, the information that is associated with the use of the at least one available carrier for the transmission may be explicit signaling, which is sent to the base station by using, for example, a primary component carrier (PCell) uplink resource.

Based on the above, the method of this embodiment can reduce the impact of the unpredictability of whether an unlicensed spectrum is available, and make full use of the unlicensed spectrum resource.

A person skilled in the art may understand that, in the foregoing method of specific implementation manners of the present invention, sequence number of each step does not imply an execution sequence, and an execution sequence of each step should be determined according to its function and internal logic, rather than limiting an implementation process of the implementation manners of the present invention.

In addition, an embodiment of the present invention further provides a computer readable medium, comprising a computer readable instruction, wherein when the computer readable instruction is executed, the following operations are performed: executing the operations of the steps of the method in the above embodiment shown in FIG. 2(a).

In addition, an embodiment of the present invention further provides a computer readable medium, comprising a computer readable instruction, wherein when the computer readable instruction is executed, the following operations are performed: executing the operations of the steps of the method in the above embodiment shown in FIG. 3.

Figure 4:
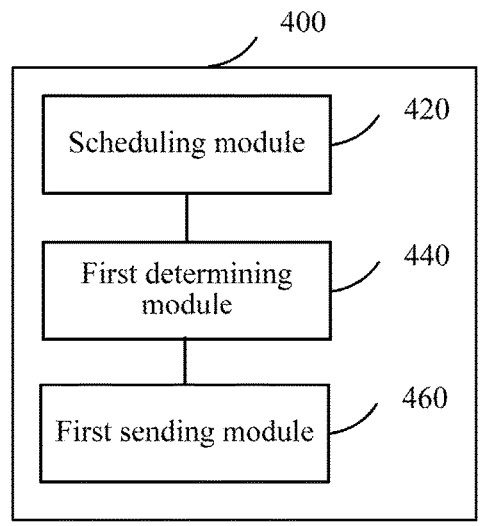
FIG. 4 is a structural block diagram of an example of a resource allocation apparatus according to an embodiment of the present invention.

FIG. 4 is a structural block diagram of an example of a resource allocation apparatus of an embodiment of the present invention. The apparatus may be or may belong to any base station. As shown in FIG. 4, the resource allocation apparatus 400 of this embodiment of the present invention comprises:

a scheduling module 420, configured to send a scheduling instruction, wherein the scheduling instruction comprises: information that is associated with at least two carriers in an unlicensed spectrum allocated to transmission of a user equipment;

a first determining module 440, configured to determine at least one available carrier in the at least two carriers; and a first sending module 460, configured to send a physical indication signal on the at least one available carrier, wherein the physical indication signal is used to occupy the at least one available carrier.

In the apparatus of this embodiment, at least two carriers are allocated to transmission of a user equipment at a scheduling moment, that is, it is intended to schedule the user equipment on at least one of the at least two carriers. At least one available carrier in the at least two carriers is determined, and a physical indication signal is used to occupy the at least one available carrier. In this way, the probability that the carrier resource is available to the user equipment is increased, thereby reducing the possibility of occurrence of the problem of resource unavailability and/or resource waste caused by the unpredictability of whether an unlicensed spectrum is available.

In a possible implementation manner, the first determining module 440 may determine one available carrier by means of, for example, clear channel assessment, and the first sending module 460 uses a physical indication signal to occupy the available carrier, so that for the user equipment, there is one available carrier in the at least two carriers allocated thereto. Specifically, the first determining module 440 may perform clear channel assessment for the at least two carriers in sequence, and determine, in response to that a result of the assessment is idle, that the corresponding carrier is the one available carrier. That is, as long as a carrier of which the result of the assessment is idle is determined, clear channel assessment will not be performed for other carriers, thereby reducing power consumption of the base station.

For example, as shown in FIG. 2(b), the base station sends a UL Grant to the user equipment in the $n^{th}$ subframe, wherein the UL Grant schedules the user equipment to perform transmission on carriers 1, 2, and 3. In the $(n+3)^{th}$ subframe, the base station performs CCA for the carriers 1, 2, and 3 in sequence, determines that the carrier 1 is busy and the carrier 2 idle, and then sends a reservation signal on the carrier 2. In this case, the base station does not need to perform CCA for the carrier 3.

In another possible implementation manner, to further increase the probability that the user equipment can use an unlicensed carrier, the first determining module 440 may determine multiple available carriers by means of, for example, clear channel assessment, and the first sending module 460 uses a physical indication signal to occupy the available carriers, so that for the user equipment, there are multiple available carriers that have been actually occupied in the at least two carriers allocated thereto. In addition, in this implementation manner, the user equipment may determine one or more of the multiple available carriers for transmission.

For example, as shown in FIG. 2(c), the base station sends a UL Grant to the user equipment in the $n^{th}$ subframe, wherein the UL Grant schedules the user equipment to perform transmission on carriers 1, 2, and 3. In the $(n+3)^{th}$ subframe, the base station performs CCA for the carriers 1, 2, and 3, determines that the carrier 1 is busy and the carriers 2 and 3 are idle, and then sends a reservation signal on the carriers 2 and 3 to occupy the carriers 2 and 3.

It should be noted that the scheduling module 420 may determine, according to a transmission requirement of the user equipment, to allocate at least two carriers to the user equipment. For example, the user equipment needs data of a higher transmission priority, and because such data is urgent, a relatively high probability of carrier availability is needed. In this case, at least two carriers may be allocated to the user equipment. In addition, it should also be noted that the at least two carriers allocated to the user equipment may be determined according to at least a historical usage status of the unlicensed spectrum, wherein the historical usage status may comprise but not limited to: the number of times of successful occupation by the base station, the number of times of failed occupation by the base station, the number of times of transmission performed for a same type of service, and the like. For example, the user equipment may be allocated at least two carriers corresponding to a large number of times of successful occupation by the base station, or may be allocated at least two carriers that can be determined according to the historical usage status to be suitable for use by the user equipment to perform the transmission.

Based on the above, the apparatus of this embodiment can reduce the occurrence of the problem of resource unavailability and/or resource waste.

Figure 5A:
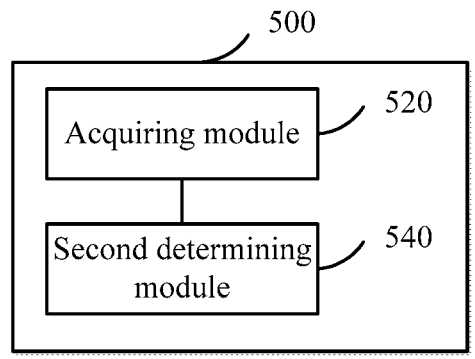
FIG. 5(a) to FIG. 5(e) are structural block diagrams of multiple examples of a transmission apparatus according to an embodiment of the present invention.

FIG. 5(a) is a structural block diagram of an example of a transmission apparatus of an embodiment of the present invention. The apparatus may be or may belong to any user equipment. As shown in FIG. 5(a), the apparatus 500 comprises:

an acquiring module 520, configured to acquire a scheduling instruction, wherein the scheduling instruction comprises information that is associated with at least two carriers in an unlicensed spectrum allocated to transmission of a user equipment; and a second determining module 540, configured to determine to perform the transmission on at least one available carrier in the at least two carriers.

As described with reference to FIG. 2(a), at least two carriers available to the user equipment are indicated in the scheduling instruction acquired by the acquiring module 520. The second determining module 540 may determine, for example, by actively performing CCA and/or listening for a physical indication signal on the at least two carriers, to perform the transmission on at least one available carrier in the at least two carriers.

Figure 5B:
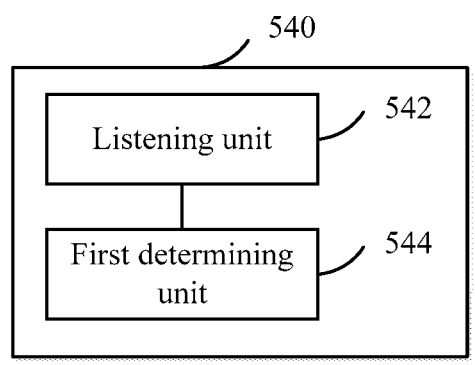

Specifically, as described with reference to FIG. 2(a), the base station may send a physical indication signal on one or more available carriers. In a possible implementation manner of the apparatus of this embodiment, the following operations may be performed: listening on carriers associated with the unlicensed spectrum, and determining, according to a result of the listening, at least one available carrier for uplink transmission. In this implementation manner, as shown in FIG. 5(b), the second determining module 540 may further comprise:

a listening unit 542, configured to listen on at least the at least two carriers; and a first determining unit 544, configured to determine the at least one available carrier in response to that a physical indication signal is obtained on at least one carrier of the at least two carriers by listening.

It should be noted that each user equipment in an LAA system can listen for a possible physical indication signal on a particular frequency band, and according to different configurations of the LAA system, the particular frequency band may be an entire frequency band or a partial frequency band of one or more carriers in an unlicensed spectrum, which may be configured in advance for the user equipment by using higher-layer signaling (for example, RRC (Radio Resource Control, Radio Resource Control) signaling). Alternatively, the user equipment may listen on only carriers associated with its transmission. The carriers associated with its transmission comprise the at least two carriers indicated by the base station in the UL Grant. That is, the listening unit 542 may listen on at least the at least two carriers. The first determining unit 544 determines that the transmission may be performed on one or more of one or more available carriers on which a physical indication signal is obtained by listening.

In a possible implementation manner, to reduce power consumption of the user equipment, the listening unit 542 may listen on the at least two carriers in sequence, and according to a required carrier quantity, after a physical indication signal is obtained by listening, will not listen on other carriers. The first determining unit 544 determines to perform the transmission on one or more available carriers corresponding to the physical indication signal.

Using a scenario shown in FIG. 2(b) as an example, the user equipment listens on the carriers 1, 2, and 3, obtains a physical indication signal on the carrier 2 by listening, and therefore determines to perform uplink transmission on the carrier 2 in the $(n+4)^{th}$ subframe.

Using a scenario shown in FIG. 2(c) as an example, the user equipment can obtain a physical indication signal on both the carriers 2 and 3 by listening. In this case, it may be determined to perform the transmission on either one or both of the carrier 2 and/or the carrier 3. Alternatively, in the scenario shown in FIG. 2(c), the user equipment listens on the carriers 1, 2, and 3 in sequence, and after obtaining a physical indication signal on the carrier 2 by listening, stops listening, that is, does not listen on the carrier 3.

Figure 5C:
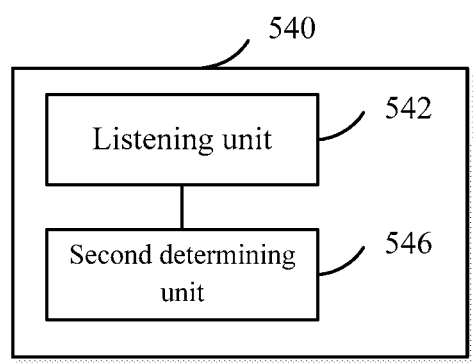

In another possible implementation manner, the apparatus of this embodiment may determine, by actively performing CCA, to perform the transmission on the at least one available carrier. In this implementation manner, as shown in FIG. 5(c), the second determining module 540 may further comprise:

a listening unit 542, configured to listen on at least the at least two carriers; and a second determining unit 546, configured to perform, in response to that a physical indication signal is obtained on at least one carrier of the at least two carriers by listening, clear channel assessment for the carrier corresponding to the physical indication signal, and determine the at least one available carrier according to a result of the assessment.

Using the scenario shown in FIG. 2(c) as an example, the user equipment can obtain a physical indication signal on both the carriers 2 and 3 by listening. In this case, the second determining unit 546 determines, by performing CCA for the carriers 2 and 3, to perform the transmission on one or two available carriers in the carriers 2 and 3.

Figure 5D:
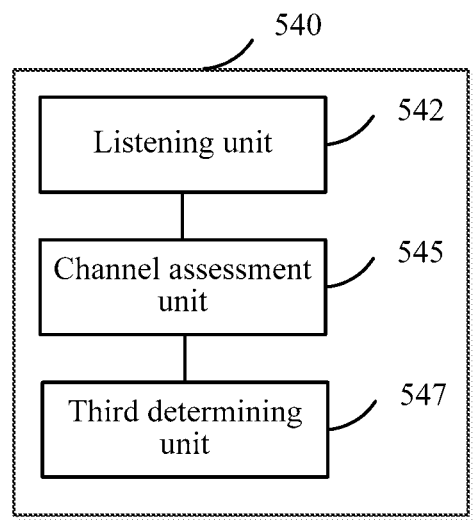
Figure 5E:
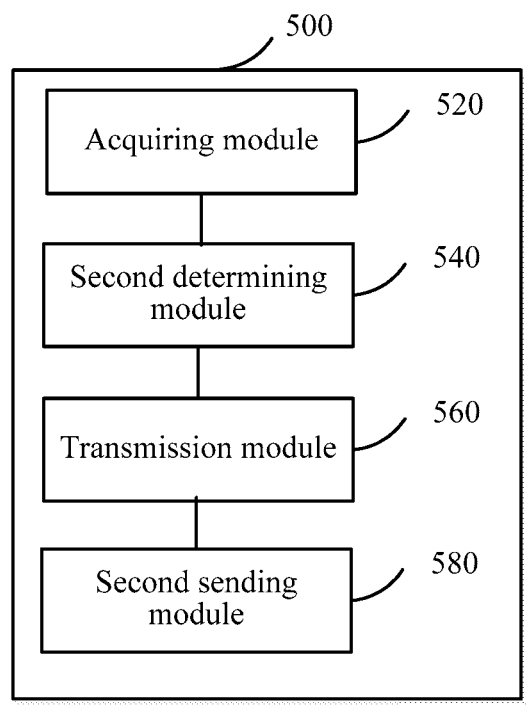

Alternatively, as shown in FIG. 5(d), the second determining module 540 may further comprise:

a listening unit 542, configured to listen on at least the at least two carriers;

a channel assessment unit 545, configured to perform clear channel assessment for at least the at least two carriers; and a third determining unit 547, configured to determine a carrier on which a physical indication signal is obtained by listening and of which the result of the assessment is idle, as the at least one available carrier.

The listening unit 542 and the channel assessment unit 545 may perform their functions concurrently or may perform their respective functions in any particular order. Still using the scenario shown in FIG. 2(*c*) as an example, a physical indication signal is obtained on the carriers 2 and 3 by listening, and it is determined by means of CCA that the carrier 3 is idle. In this case, it is determined to perform the transmission on the carrier 3.

In addition, as shown in FIG. 5(*e*), the apparatus of this embodiment further comprises:

a transmission module 560, configured to perform the transmission by using the at least one available carrier; and a second sending module 580, configured to send information that is associated with use of the at least one available carrier for the transmission, so as to enable the base station to learn the usage status of the available carrier. The information that is associated with the use of the at least one available carrier for the transmission may be data being transmitted. If the base station receives the data of the user equipment on an available carrier, the base station may consider that the available carrier is occupied by the user equipment. In this case, the transmission module 560 is actually the same module as the second sending module 580. Alternatively, the information that is associated with the use of the at least one available carrier for the transmission may be explicit signaling, which is sent to the base station by using, for example, a primary component carrier (PCell) uplink resource.

Based on the above, the apparatus of this embodiment can reduce the impact of the unpredictability of whether an unlicensed spectrum is available, and make full use of the unlicensed spectrum resource.

Figure 6:
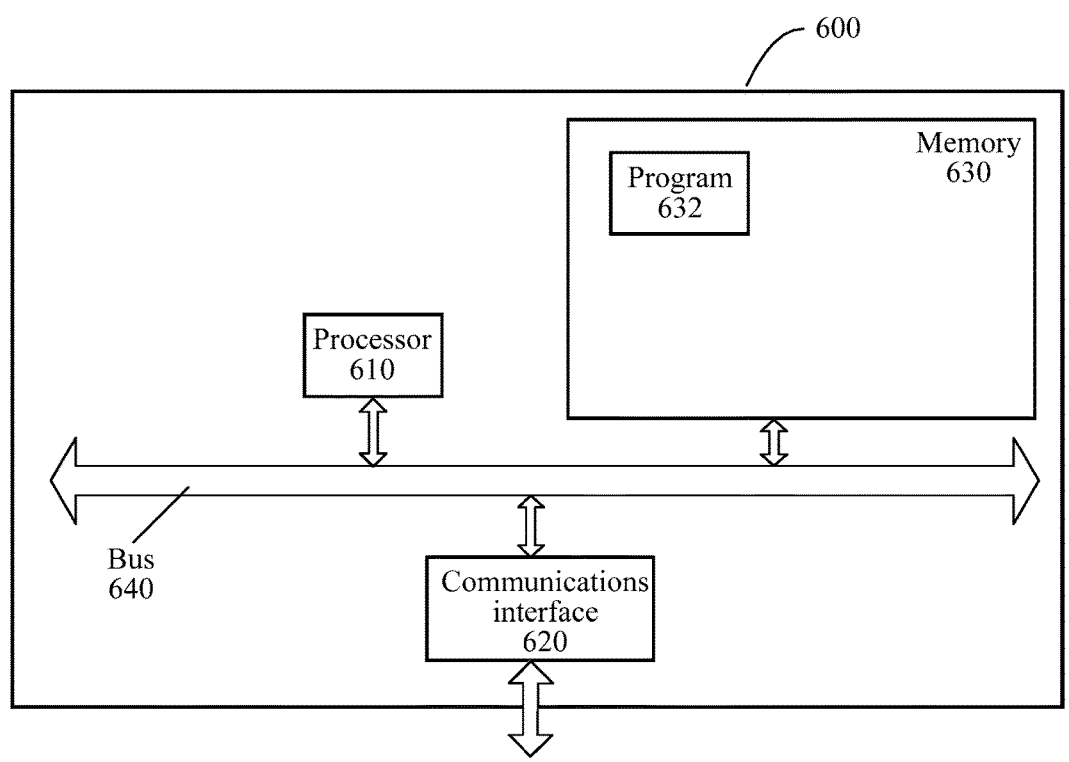
FIG. 6 is a structural block diagram of another example of a resource allocation apparatus according to an embodiment of the present invention.

FIG. 6 is a schematic structural diagram of still another example of a resource allocation apparatus provided by an embodiment of the present application, and this specific embodiment of the present application does not limit a specific implementation of the resource allocation apparatus. As shown in FIG. 6, the resource allocation apparatus 600 may comprise:

a processor (processor) 610, a communications interface (Communications interface) 620, a memory (memory) 630, and a communications bus 640.

The processor 610, the communications interface 620, and the memory 630 implement communication between each other through the communications bus 640.

The communications interface 620 is configured to communicate with a network element such as a client.

The processor 610 is configured to execute a program 632, and specifically may execute related steps in the method embodiment shown in FIG. 2(*a*).

Specifically, the program 632 may include program code, where the program code includes a computer operation instruction.

The processor 610 may be a central processing unit CPU, or an application-specific integrated circuit ASIC (Application Specific Integrated Circuit), or one or more integrated circuits configured to implement the embodiments of the present application.

The memory 630 is configured to store the program 632. The memory 630 may include a high-speed RAM memory, and may also include a non-volatile memory (non-volatile memory), for example, at least one magnetic disk storage.

The program 632 may be specifically configured to cause the resource allocation apparatus 600 to execute the following steps:

sending a scheduling instruction, wherein the scheduling instruction comprises: information that is associated with at least two carriers in an unlicensed spectrum allocated to transmission of a user equipment;

determining at least one available carrier in the at least two carriers; and sending a physical indication signal on the at least one available carrier, wherein the physical indication signal is used to occupy the at least one available carrier.

For the specific implementation of the steps in the program 632, refer to corresponding descriptions in the foregoing embodiments of corresponding steps and units, and details are not described herein again. It may be clearly understood by a person skilled in the art that, for the purpose of convenient and brief description, for a detailed working process of the foregoing device and module, refer to a corresponding process in the foregoing method embodiments, and details are not described herein again.

A person skilled in the art may clearly know that, for convenient and brief description, for the specific operating process of the foregoing device and module, reference may be made to the corresponding descriptions in the foregoing device embodiment, and no further details are provided herein.

Figure 7:
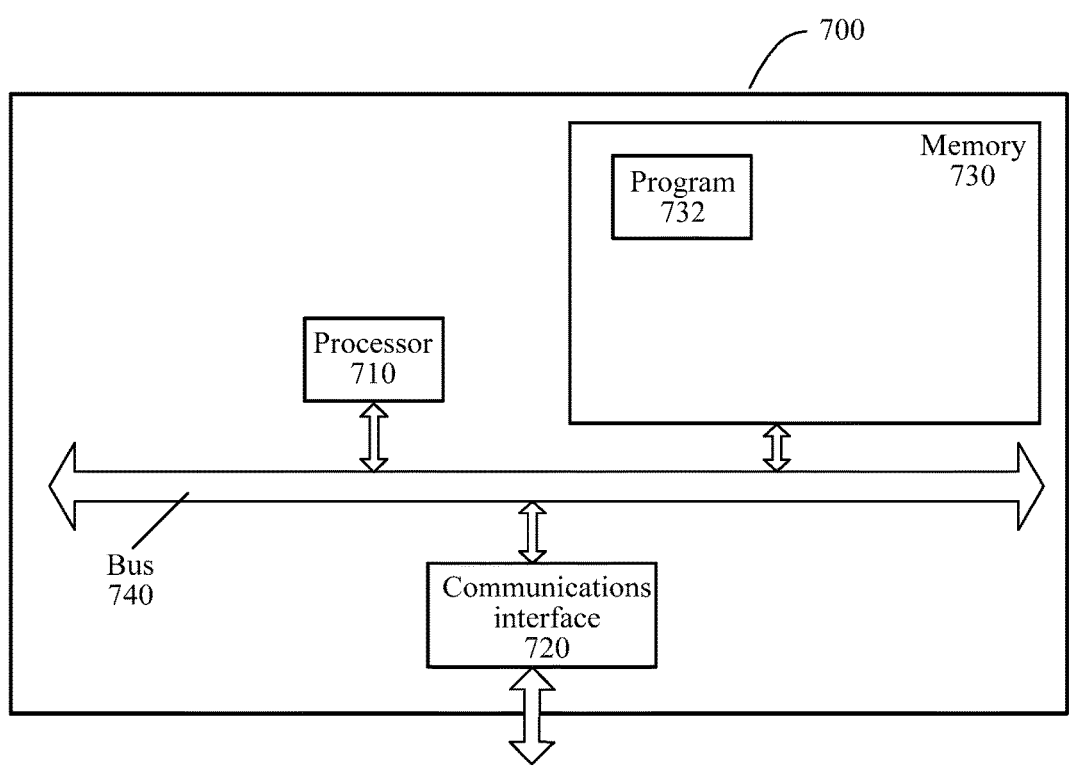
FIG. 7 is a structural block diagram of another example of a transmission apparatus according to an embodiment of the present invention.

FIG. 7 is a schematic structural diagram of still another example of a transmission apparatus according to an embodiment of the present application, and this embodiment of the present application does not limit a specific implementation of the transmission apparatus. As shown in FIG. 7, the transmission apparatus 700 may include:

a processor (processor) 710, a communications interface (Communications interface) 720, a memory (memory) 730, and a communications bus 740.

The processor 710, the communications interface 720, and the memory 730 implement communication between each other through the communications bus 740.

The communications interface 720 is configured to communicate with a network element such as a client.

The processor 710 is configured to execute a program 732, and specifically may execute related steps in the method embodiment shown in FIG. 3.

Specifically, the program 732 may include program code, where the program code includes a computer operation instruction.

The processor 710 may be a central processing unit CPU, or an application-specific integrated circuit ASIC (Application Specific Integrated Circuit), or one or more integrated circuits configured to implement the embodiments of the present application.

The memory 730 is configured to store the program 732. The memory 730 may include a high-speed RAM memory, and may also include a non-volatile memory (non-volatile memory), for example, at least one magnetic disk storage.

The program 732 may be specifically configured to cause the transmission apparatus 700 to execute the following steps:

acquiring a scheduling instruction, wherein the scheduling instruction comprises information that is associated with at least two carriers in an unlicensed spectrum allocated to transmission of a user equipment; and determining to perform the transmission on at least one available carrier in the at least two carriers.

For the specific implementation of the steps in the program 732, refer to corresponding descriptions in the foregoing embodiments of corresponding steps and units, and details are not described herein again. It may be clearly understood by a person skilled in the art that, for the purpose of convenient and brief description, for a detailed working process of the foregoing device and module, refer to a corresponding process in the foregoing method embodiments, and details are not described herein again.

A person skilled in the art may clearly know that, for convenient and brief description, for the specific operating process of the foregoing device and module, reference may be made to the corresponding descriptions in the foregoing device embodiment, and no further details are provided herein.

Although a topic described herein is provided in common context executed with reference to executions of an operating system and an application program in a computer system, a person skilled in the art may know that another implementation may be executed with reference to a program module of another type. Generally, the program module comprises a routine, a program, a component, a data structure, and a structure of another type that execute a specific task or implement a specific abstract data type. A person skilled in the art may understand that, the topic described herein may be implemented by using configuration of another computer system, comprising a handheld device, a multi-processor system, a microprocessor-based or programmable consuming electronic product, a small-size computer, a mainframe computer or the like; or by using a distributed computer environment in which a task is executed by a remote processing device connected to a communications network. In the distributed computer environment, the program module may be located in local and remote storage devices.

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or some of the steps of the methods described in the embodiments of the present invention. The computer readable storage medium comprises a volatile and non-volatile, removable and non-removable medium that is implemented by using any method or technology used for storing information such as a computer readable instruction, a data structure, a program module, or other data. The computer readable storage medium specifically includes, but not limited to, a USB disk, a removable hard disk, a read-only memory (ROM, Read-Only Memory), a random access memory (RAM, Random Access Memory), an erasable programmable read-only memory (EPROM), an electrically erasable programmable read-only memory (EEPROM), a flash disk or another solid memory technology, a CD-ROM, a digital video disk (DVD), an HD-DVD, a blue-ray (Blue-Ray) or another optical storage device, a tape, disk storage or another magnetic storage device, or any other medium that can be used for storing required information and can be accessed by a computer.

The foregoing implementation manners are merely used for describing the present invention, rather than limiting the present invention. A person of ordinary skill in the art may made various changes and modifications without departing from the spirit and scope of the present invention, and therefore, all equivalent technical solutions shall belong to the scope of the present invention, and the protection scope of the present invention shall be subject to the claims.

What is claimed is:

1. A resource allocation method, comprising:
   sending, to a user equipment, a scheduling instruction, wherein the scheduling instruction comprises: information that is associated with at least two carriers in an unlicensed spectrum allocated for uplink (UL) data transmission by the user equipment, the at least two carriers being determined according to at least a historical usage status of the unlicensed spectrum comprising a number of times of transmission performed for same type of service;
   determining one available carrier in the at least two carriers, wherein, determining the available carrier comprises: performing clear channel assessment on the at least two carriers one after another in a predetermined sequence; determining, once a first carrier is idle, the first carrier as the available carrier and terminating the process of clear channel assessment on other carriers; and
   sending a physical indication signal on the at least one available carrier, wherein the physical indication signal is used to occupy the at least one available carrier that is to be used by the user equipment for the UL data transmission.

2. The method of claim 1, wherein the method further comprises:
   sending the scheduling instruction according to at least a transmission requirement of the user equipment.

3. A transmission method, comprising:
   acquiring, by a user equipment, a scheduling instruction from a base station, wherein the scheduling instruction comprises information that is associated with at least two carriers in an unlicensed spectrum allocated for uplink (UL) data transmission by the user equipment, the at least two carriers being determined according to at least a historical usage status of the unlicensed spectrum comprising a number of times of transmission performed for same type of service; and
   determining to perform the UL data transmission on one available carrier in the at least two carriers, wherein, the available carrier is selected by the base station, and the selection of the available carrier comprises performing clear channel assessment on the at least two carriers one after another in a predetermined sequence; determining, once a first carrier is idle, the first carrier as the available carrier and terminating the process of clear channel assessment on other carriers.

4. The method of claim 3, wherein the method further includes listening on the at least two carriers comprises:
   listening on the at least two carriers in sequence.

5. The method of claim 3, wherein the method further comprises:

sending information that is associated with use of the at least one available carrier for the transmission.

6. The method of claim 3, wherein the method further comprises:
performing the UL data transmission by using the at least one available carrier.

7. A resource allocation apparatus, comprising:
a scheduling module, configured to send, to a user equipment, a scheduling instruction, wherein the scheduling instruction comprises: information that is associated with at least two carriers in an unlicensed spectrum allocated for uplink (UL) data transmission by the user equipment, the at least two carriers being determined according to at least a historical usage status of the unlicensed spectrum comprising a number of times of transmission performed for same type of service;
a first determining module, configured to determine one available carrier in the at least two carriers, based on clear channel assessment on the at least two carriers one after another in a predetermined sequence, and to determine, once a first carrier is idle, the first carrier as the available carrier and terminate the process of clear channel assessment on other carriers; and
a first sending module, configured to send a physical indication signal on the at least one available carrier, wherein the physical indication signal is used to occupy the at least one available carrier that is to be used by the user equipment for the UL data transmission.

8. The apparatus of claim 7, wherein the scheduling module is further configured to send the scheduling instruction according to at least a transmission requirement of the user equipment.

9. A transmission apparatus of a user equipment, comprising:
an acquiring module, configured to acquire, a scheduling instruction from a base station, wherein the scheduling instruction comprises information that is associated with at least two carriers in an unlicensed spectrum allocated for uplink (UL) data transmission by the user equipment, the at least two carriers being determined according to at least a historical usage status of the unlicensed spectrum comprising a number of times of transmission performed for same type of service; and
a second determining module, configured to determine to perform the UL data transmission on one available carrier in the at least two carriers, wherein, the available carrier is selected by the base station, and the selection of the available carrier comprises performing clear channel assessment on the at least two carriers one after another in a predetermined sequence; determining, once a first carrier is idle, the first carrier as the available carrier and terminating the process of clear channel assessment on other carriers.

10. The apparatus of claim 9, wherein the listening unit is configured to listen on the at least two carriers in sequence.

11. The apparatus of claim 9, wherein the apparatus further comprises:
a transmission module, configured to send information that is associated with use of the at least one available carrier for the transmission.

12. The apparatus of claim 9, wherein the apparatus further comprises:
a second sending module, configured to perform the transmission by using the at least one available carrier.

13. A resource allocation apparatus, comprising:
a transceiver;
a memory, configured to store an instruction; and
a processor, configured to execute the instruction stored in the memory, wherein the instruction causes the processor to execute the following steps:
sending, to a user equipment, a scheduling instruction by using the transceiver, wherein the scheduling instruction comprises: information that is associated with at least two carriers in an unlicensed spectrum allocated for uplink (UL) data transmission by the user equipment, the at least two carriers being determined according to at least a historical usage status of the unlicensed spectrum comprising a number of times of transmission performed for same type of service;
determining one available carrier in the at least two carriers, wherein, determining the available carrier comprises: performing clear channel assessment on the at least two carriers one after another in a predetermined sequence; determining, once a first carrier is idle, the first carrier as the available carrier and terminating the process of clear channel assessment on other carriers; and
sending a physical indication signal on the at least one available carrier by using the transceiver, wherein the physical indication signal is used to occupy the at least one available carrier that is to be used by the user equipment for the UL data transmission.

14. A transmission apparatus of a user equipment, comprising:
a transceiver;
a memory, configured to store an instruction; and
a processor, configured to execute the instruction stored in the memory, wherein the instruction causes the processor to execute the following steps:
acquiring, from a base station, a scheduling instruction by using the transceiver, wherein the scheduling instruction comprises information that is associated with at least two carriers in an unlicensed spectrum allocated for uplink (UL) data transmission by the user equipment, the at least two carriers being determined according to at least a historical usage status of the unlicensed spectrum comprising a number of times of transmission performed for same type of service; and determining to perform the UL data transmission on one available carrier in the at least two carriers, wherein, the available carrier is selected by the base station, and the selection of the available carrier comprises performing clear channel assessment on the at least two carriers one after another in a predetermined sequence; determining, once a first carrier is idle, the first carrier as the available carrier and terminating the process of clear channel assessment on other carriers.

* * * * *

UNITED STATES PATENT AND TRADEMARK OFFICE
CERTIFICATE OF CORRECTION

PATENT NO. : 10,349,409 B2  
APPLICATION NO. : 15/241481  
DATED : July 9, 2019  
INVENTOR(S) : Weicai Huang and Na Wei Page 1 of 1

It is certified that error appears in the above-identified patent and that said Letters Patent is hereby corrected as shown below:

On the Title Page

Assignee, item (73):
"BEIJING RUI TUO TECH CO., LTD." should read -- BEIJING ZHIGU RUI TUO TECH CO., LTD. --.

Signed and Sealed this  
Eighth Day of October, 2019

Andrei Iancu  
*Director of the United States Patent and Trademark Office*